(12) United States Patent
Albu et al.

(10) Patent No.: US 8,417,039 B2
(45) Date of Patent: Apr. 9, 2013

(54) MOTION DETECTION TECHNIQUES FOR IMPROVED IMAGE REMOTING

(75) Inventors: Voicu Anton Albu, Bellevue, WA (US); Nadim Y. Abdo, Redmond, WA (US); Charles Lawrence Zitnick, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 12/793,486

(22) Filed: Jun. 3, 2010

(65) Prior Publication Data

US 2011/0299785 A1 Dec. 8, 2011

(51) Int. Cl.
*G06K 9/62* (2006.01)

(52) U.S. Cl.
USPC .................. 382/209; 382/254; 382/232

(58) Field of Classification Search .................. None
See application file for complete search history.

(56) References Cited

U.S. PATENT DOCUMENTS

| | | |
|---|---|---|
| 2005/0210151 A1 | 9/2005 | Abdo et al. |
| 2006/0005189 A1 | 1/2006 | Vega et al. |
| 2008/0313545 A1 | 12/2008 | Patel et al. |
| 2009/0007106 A1 | 1/2009 | Araujo, Jr. et al. |
| 2009/0064136 A1 | 3/2009 | Dow et al. |
| 2009/0077252 A1 | 3/2009 | Abdo et al. |
| 2009/0189893 A1 | 7/2009 | Petrov et al. |
| 2009/0300606 A1 | 12/2009 | Miller et al. |
| 2010/0001995 A1 | 1/2010 | Hamill et al. |
| 2010/0239177 A1* | 9/2010 | Thomas et al. ............... 382/232 |
| 2011/0033128 A1* | 2/2011 | Watkins et al. ............... 382/254 |

FOREIGN PATENT DOCUMENTS

| | | |
|---|---|---|
| WO | WO 2008/018860 | 2/2008 |
| WO | WO 2008018860 A1 * | 2/2008 |

OTHER PUBLICATIONS

Lefebvre et al., "Perfect Spatial Hashing", Microsoft Research, International Conference on Computer Graphics and Interactive Techniques, (No Month Available) 2006, 579-588.
Nexus Concepts, "Desktop Share Version History", http://www.nexusconcepts.com/dshistory.html, accessed, Apr. 8, 2010, 3 pages.
Intel, "Intelligent IP Video Encoder Platform Delivers Digital Security Surveillance Solutions", Bulpitt-V, Case Study, Apr. 8, 2010, 4 pages.

* cited by examiner

*Primary Examiner* — Claire X Wang
*Assistant Examiner* — Thomas A James
(74) *Attorney, Agent, or Firm* — Woodcock Washburn LLP

(57) ABSTRACT

Techniques are disclosed for acceleration techniques for improved image remoting. A rolling 2D hash of a first image sent to a client is computed. When the server has a second image to send to the client, it calculates a rolling 2D hash of the new image. It also calculates "pivot points" for the images based on the rolling 2D hashes. Based on the pivot points, it determines possible matching hash windows between the two images that correspond to window moves or scrolls. Where a match is confirmed, it determines whether a "larger" a larger matching rectangle exists between the two images. It then instructs the client to display the matching rectangle that exists in the first image that the client has in the appropriate location in the second image, thereby saving the bandwidth requirements to re-transmit it to the client.

20 Claims, 11 Drawing Sheets

MOTION DETECTION TECHNIQUES FOR IMPROVED IMAGE REMOTING

BACKGROUND

Although computers were once isolated and had minimal or little interaction with other computers, computers now interact with a wide variety of other computers through Local Area Networks (LANs), Wide Area Networks (WANs), dial-up connections, and the like. With the widespread growth of the INTERNET® computer network, connectivity between computers has become more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as remote presentation, which can use protocols such as Remote Desktop Protocol (RDP), Independent Computing Architecture (ICA), and others to share a desktop and other applications with a remote client. Such computing systems typically transmit the keyboard presses and mouse clicks or selections from the client to a server, relaying the screen updates back in the other direction over a network connection (e.g., the INTERNET®). As such, the user has the experience as if their machine is executing the applications locally, when in reality the client device is only sent screen-shots of the applications as they appear on the server side.

During a remote presentation session, the amount of image data to be sent to a client can be very large, which results in a combination of high use of processing resources to compress and encode the data, and high bandwidth requirements to transfer the data over a network. In particular, moving a window on the screen, or scrolling through a document, can result in a large amount of image data that needs to be compressed, encoded, and transferred. This leads to a poor remote presentation session experience, with large delays between a user's actions and the corresponding update on a display of the client. This may also result in overall degraded performance of the remote presentation session server, such as through CPU starvation.

SUMMARY

It would therefore be an improvement to modify a remote presentation session server to implement techniques that conserve or reduce the amount of server processing resources and/or bandwidth required. In particular, it would be advantageous to detect identical areas between consecutive frames (or images), at the same or at different position within the frame. In such cases, the area would not have to be resent to the client, instead it would be copied from the existing location within the frame to the new location of the next frame. This would allow a large class of screen changes (such as window moves, document scrolls, and simple block animations) to reuse existing information on the client side, therefore halving (on average) the amount of CPU and bandwidth required to transmit these changes to the client.

In a remote presentation session, a server produces a series of images, and a client displays that series of images (though, through techniques such as client-side caching, not every part of every image may be sent from the client to the server; rather the server may send the client an indication to display something that the client already has).

In an embodiment, at the beginning of the remote presentation session, the server chooses a width and a height, much smaller than the width and the height of the image surface that needs to be transmitted to the client. This is referred to as "hash window size." The smaller the window size, the more CPU is required for motion detection, and the finer-grained (smaller) motions that can be found.

In an embodiment, the client already has a first image, and the server processes a second image that the client is to display.

When the server processes the first image, a 2D hash is calculated for every hash window centered in each pixel of the first image. For the second frame, the server also calculates a 2D hash for each hash window centered in each pixel of the second image. Based on the 2D hashes, "pivot points" for each image are determined, and the 2D hash values at those pivot points are compared between the images to determine where matching hash windows (rectangular portions of the two images that match each other) occur.

In an embodiment, the implementation uses a block hash function that can be calculated from the hash function of the block subdivisions. Formally, this can be written as a function H(RECT) defined on any area of an image with values in the integer domain which has the following property: H(R1+R2) =K(H(R1), H(R2)) and H(R1−R2)=J(H(R1), H(R2)), where K and J are known and easy to calculate (i.e. can be computed in constant time O(c)). This gives the hash function a rolling property (i.e. the value of the hash window can be computed by adding and/or subtracting the hash values of the component areas).

The area of the matching hash windows may be a subset of what actually matches in this image. Thus, a "larger" matching rectangle between the two images may be found by examining the pixels adjacent to the matching hash windows for possible matches, and since the client already possesses the first image, this matching rectangle does not need to be sent to the client; rather the client can create the second image using this matching rectangle that is part of the first image.

For instance, where the images are subdivided into a grid of "tiles," the server may send to the client a list of which tiles are "dirty" (or changed from the most recent image) and new tiles to replace those dirty tiles (or indications for the client to display tiles it has already cached to replace those dirty tiles). The server may remove any tile that is completely occupied by the position of this matching rectangle in the second image from the dirty tile list, and (where the client uses a single frame buffer—memory area where images are created or built before being displayed on a display device—and overwrites each previous remote presentation session image with the newly received image) instruct the client to copy the matching rectangle to that new location before copying the new tiles to spots occupied by dirty tiles. Upon completing this, the client will be able to display the second image without having received some portion of it anew—the matching rectangle corresponding to a window move or scroll, and thus bandwidth (and server resources in processing the moving rectangle for remote presentation session transmission) is saved.

This disclosure encompasses systems, methods and computer-readable storage media for implementing these teachings.

The primary embodiments described herein discuss computer-executable instructions executed by one or more processors of a computing device. However, it may be appreciated that these techniques may be implemented entirely in terms of hardware, such as through appropriately programming field-programmable gate arrays (FPGAs), or some combination thereof. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer-readable media for acceleration techniques for improved image remoting are further described with reference to the accompanying drawings in which.

DETAILED DESCRIPTION OF ILLUSTRATIVE EMBODIMENTS

Figure 1:
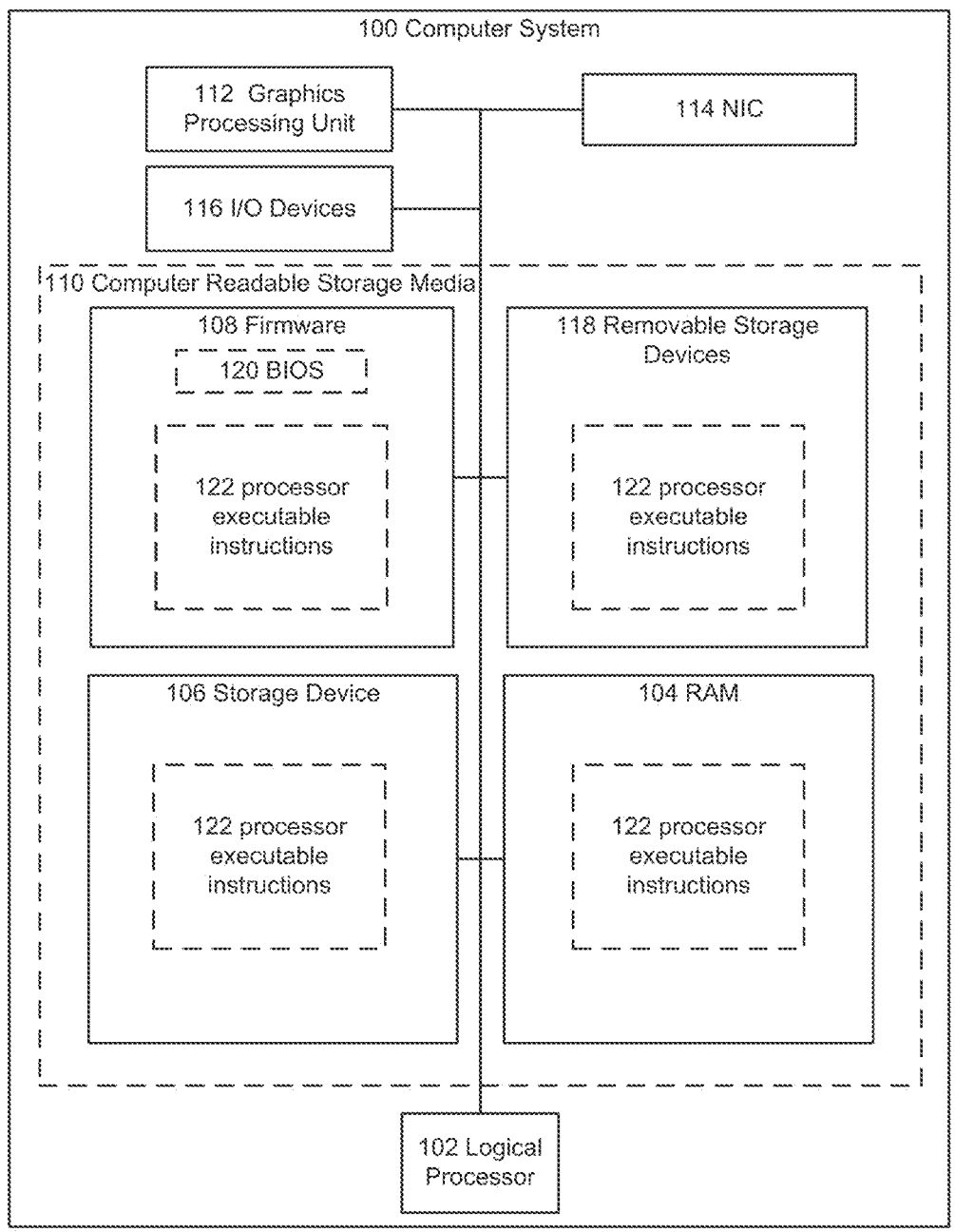
FIG. 1 illustrates an exemplary general purpose computing environment in which in which the techniques described herein may be embodied.

FIG. 1 is a block diagram of a general purpose computing device in which the techniques described herein may be employed. The computing system environment 120 is only one example of a suitable computing environment and is not intended to suggest any limitation as to the scope of use or functionality of the presently disclosed subject matter. Neither should the computing environment 120 be interpreted as having any dependency or requirement relating to any one or combination of components illustrated in the exemplary operating environment 120. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer-readable media. Computer-readable media can be any available media that can be accessed by computer 141 and includes both volatile and nonvolatile media, removable and non-removable media. The system memory 22 includes computer-readable storage media in the form of volatile and/or nonvolatile memory such as read only memory (ROM) 24 and random access memory (RAM) 25. A basic input/output system 26 (BIOS), containing the basic routines that help to transfer information between elements within computer 141, such as during start-up, is typically stored in ROM 24. RAM 25 typically contains data and/or program modules that are immediately accessible to and/or presently being operated on by processing unit 21. By way of example, and not limitation, FIG. 1 illustrates operating system 35, application programs 36, other program modules 37, and program data 38.

The computer 141 may also include other removable/non-removable, volatile/nonvolatile computer storage media. By way of example only, FIG. 1 illustrates a hard disk drive 27 that reads from or writes to non-removable, nonvolatile magnetic media, a magnetic disk drive 28 that reads from or writes to a removable, nonvolatile magnetic disk 29, and an optical disk drive 30 that reads from or writes to a removable, nonvolatile optical disk 31 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 27 is typically connected to the system bus 23 through an non-removable memory interface such as interface 32, and magnetic disk drive 28 and optical disk drive 30 are typically connected to the system bus 23 by a removable memory interface, such as interfaces 33 and 34.

The drives and their associated computer storage media discussed above and illustrated in FIG. 1, provide storage of computer-readable instructions, data structures, program modules and other data for the computer 141. In FIG. 1, for example, hard disk drive 27 is illustrated as storing operating system 35, application programs 36, other program modules 37, and program data 38. Note that these components can either be the same as or different from operating system 35, application programs 36, other program modules 37, and program data 38 depicted in RAM 25. At a minimum, they are different copies. A user may enter commands and information into the computer 141 through input devices such as a keyboard 40 and pointing device 42, commonly referred to as a mouse, trackball or touch pad. Other input devices (not shown) may include a microphone, joystick, game pad, satellite dish, scanner, or the like. These and other input devices are often connected to the processing unit 21 through a user input interface 46 that is coupled to the system bus, but may be connected by other interface and bus structures, such as a parallel port, game port or a universal serial bus (USB). A monitor 47 or other type of display device is also connected to the system bus 23 via an interface, such as a video interface 48. In addition to the monitor, computers may also include other peripheral output devices such as speakers and printer, which may be connected through a output peripheral interface 46.

The computer 141 may operate in a networked environment using logical connections to one or more remote computers, such as a remote computer 49. The remote computer 49 may be a personal computer, a server, a router, a network PC, a peer device or other common network node, and typically includes many or all of the elements described above relative to the computer 141, although only a memory storage device 50 has been illustrated in FIG. 1, which has stored on media thereon applications 36'. The logical connections depicted in FIG. 1 include a local area network (LAN) 51 and a wide area network (WAN) 52, but may also include other networks. Such networking environments are commonplace in offices, enterprise-wide computer networks, intranets and the Internet.

When used in a LAN networking environment, the computer 141 is connected to the LAN 51 through a network interface or adapter 53. When used in a WAN networking environment, the computer 141 typically includes a modem 54 or other means for establishing communications over the WAN 52, such as the Internet. The modem 54, which may be internal or external, may be connected to the system bus 23 via the user input interface 46, or other appropriate mechanism. In a networked environment, program modules depicted relative to the computer 141, or portions thereof, may be stored in the remote memory storage device. By way of example, and not limitation, FIG. 1 illustrates remote application programs 36' as residing on memory device 50. It will be appreciated that the network connections shown are exemplary and other means of establishing a communications link between the computers may be used.

Computer 141 may also have a host adapter 55, which connects to a storage device 62 via SCSI bus 56.

Figure 2:
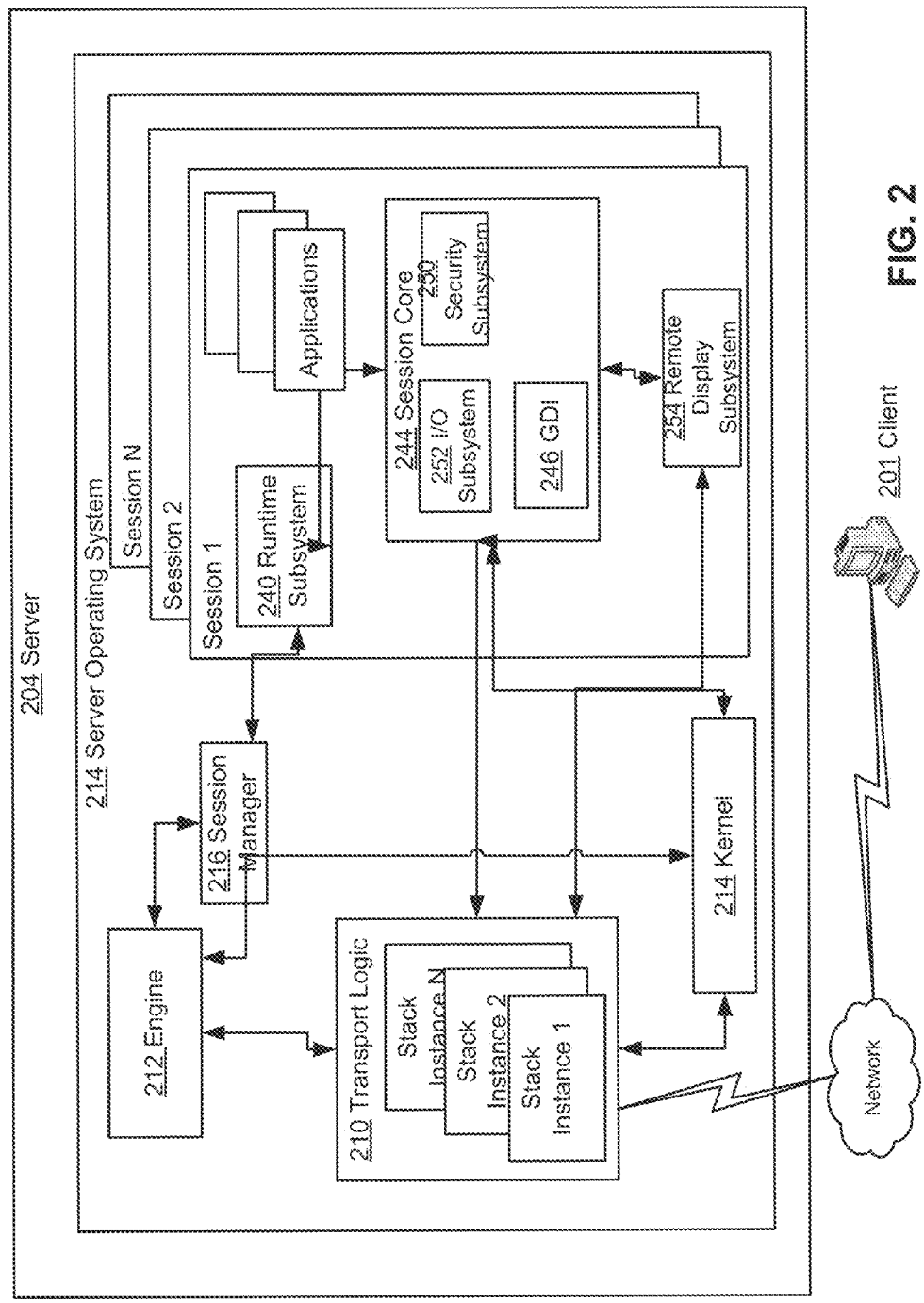
FIG. 2 depicts an example remote presentation session server wherein aspects of the present disclosure can be implemented.

Referring now to FIG. 2, it generally illustrates an example environment wherein aspects of the present disclosure can be implemented. One skilled in the art can appreciate that the example elements depicted by FIG. 2 are illustrated to provide an operational framework for describing the present disclosure. Accordingly, in some embodiments the physical layout of each environment may be different depending on different implementation schemes. Thus the example operational framework is to be treated as illustrative only and in no way limit the scope of the claims. One skilled in the art can also appreciate that the following discussion is introductory.

Generally, FIG. 2 depicts a high level overview of a server environment that can be configured to include aspects of the present disclosure. In reference to the figure, depicted is a server 204 that can include circuitry configured to effectuate a remote presentation session server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present disclosure can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present disclosure can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a remote presentation session server, the remote display subsystem 254 can be configured to include virtual display driver(s) that may not be associated with displays physically attacked to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present disclosure, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Figure 3A:
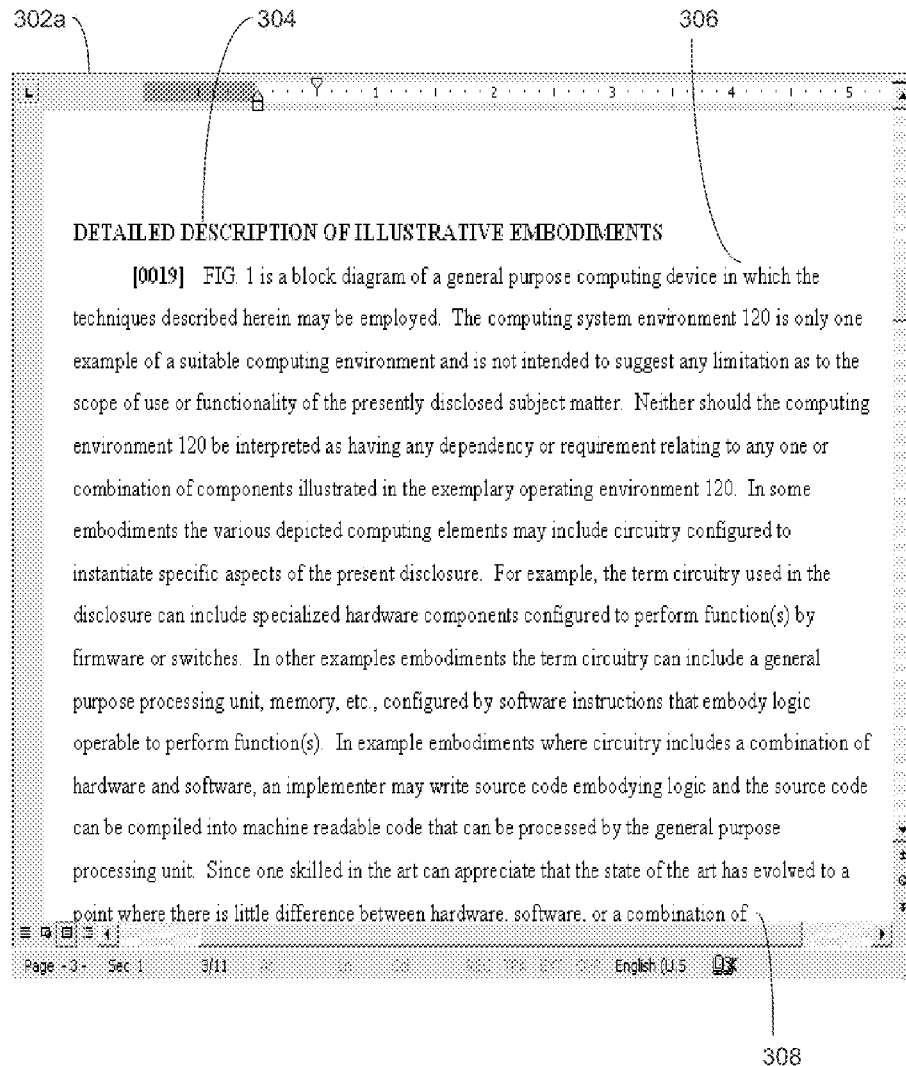
FIG. 3A depicts an example window to be transmitted in a remote presentation session.

FIG. 3A depicts an example window to be transmitted in a remote presentation session. This remote presentation session may comprise a remote presentation session as described with respect to FIG. 2. Window 302a contains text, including lines of text 304, 306, and 308.

Figure 3B:
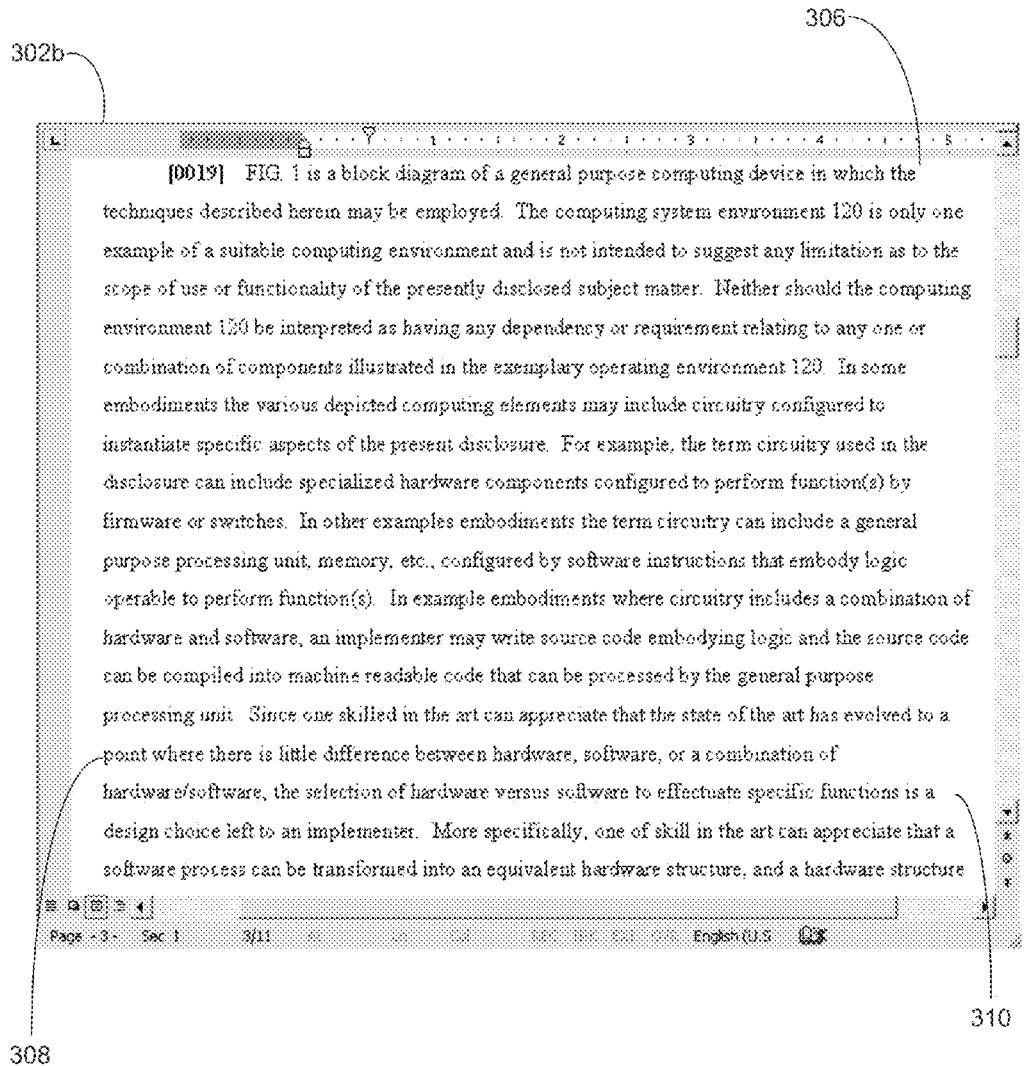
FIG. 3B depicts another example window (the example window of FIG. 3A after it has been scrolled) to be transmitted in a remote presentation session.

FIG. 3B depicts another example window (the example window of FIG. 3A after it has been scrolled) to be transmitted in a remote presentation session. Window 302b also contains text, like window 302a. The text of window 302a has been scrolled downward to produce the text of window 302b. For instance, line of text 304 does not appear in window 302b, with line of text 306 being the topmost visible line of text in window 302b. Line of text 308, which was only partially visible in window 302a, is now fully visible, and below it is text that did not appear in window 302a, starting at line of text 310.

As can be seen by comparing FIGS. 3A and 3B, almost all of the content of window 302a still appears in window 302b—its position has merely been shifted. In a remote presentation session where window 302b follows window 302a, the client may already have all of the information for window 302a available to it (such as where it caches the images, or the sub portions of images called "tiles," arranged in a grid format). It may be that under prior techniques, the image data from window 302a already possessed by the client cannot be reused to construct window 302b on the client side, even though the images are very similar. Where tiles are cached, this may be because the scroll mis-aligns the text within the tile grid (e.g. the grid comprises 20 pixel by 20 pixel tiles, and the scroll is of a number of pixels not evenly divisible by 20, such as 22). The techniques disclosed in more detail in the following figures allow the image data from window 302a to be re-used in window 302b, so that the client does not need to be sent that data, saving on bandwidth (and server processing resources in compressing and encoding this data).

Figure 4:
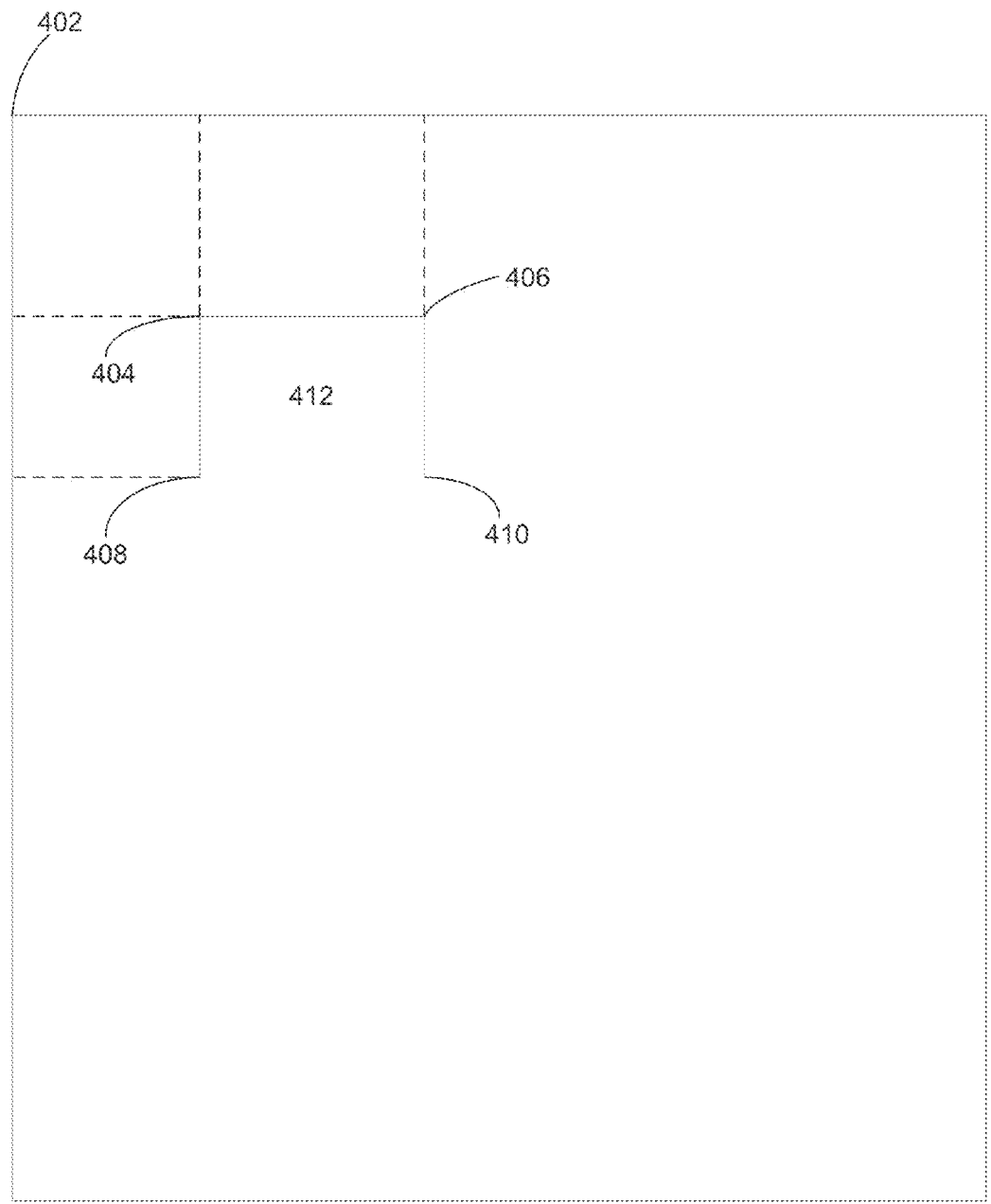
FIG. 4 depicts a technique for determining a rolling 2D hash for an arbitrary rectangle of an image.

FIG. 4 depicts a technique for determining a rolling 2D hash for an arbitrary rectangle of an image. This technique may be performed, for instance, on the windows of FIGS. 3A and 3B.

In an embodiment of the present techniques, a rolling two-dimensional (2D) hash is calculated for each pixel of an image (possibly excluding edge cases, as described below). A rolling 2D hash comprises a function that assigns each pixel a unique value dependent only upon that pixel and the pixels adjoining it, but not on the position of the pixel within an image. Such a rolling 2D hash may be determined in linear time for each pixel in an image.

For instance, where the image is an image expressed in RGB ("red-green-blue") format, each pixel of the image may be converted to its luminance value (such as by setting the luminance value to equal 0.3R+0.59G+0.11B). Then, a rolling 2D hash may be calculated for each pixel by setting the rolling 2D hash for that pixel equal to the sum of all the luminance values for all pixels in a rectangle defined by a base-point (such as the upper-left-corner of the image) and that pixel's coordinates (e.g. (x, y) pair). This may further be modified by a number (referred to herein as the "modifying number") to increase the likelihood of an even distribution of hash values. For instance this may be expressed by the equations:

$$H(P_n)=53 \cdot P_n+H(P_{n-1}) \text{ or } H(P_n)=53 \cdot (P_n+H(P_{n-1}))$$

where H(X) is a function that computes the rolling 2D hash of X, $P_n$ is the current pixel, and $P_{n-1}$ is the pixel that precedes the current pixel. In the above equation, the modifying number is 53. The modifying number may be selected, for instance, to be a prime number, such as 53 that is likely to cause H(X) to produce distributed bit patterns. When used in conjunction with modulo arithmetic (i.e. the limited register size of the computer), this also amplifies the distribution of the hash values in the domain. It may be that too small a prime number or too large a prime number may not do this.

Once a rolling 2D hash has been computed based on a pixel's coordinates and the upper-left corner of the image, a rolling 2D hash may be computed for an arbitrary rectangle within the image based on that first rolling 2D hash. Let rectangle 412 be the rectangle with corners 404, 406, 408, and 410. The pixel at each of 404, 406, 408, and 410 has a rolling 2D has calculated for the rectangle defined by that pixel's location and the upper-left corner of the image 402. Given that, arbitrary rectangle 412 may be determined by subtracting from the rolling 2D hash of pixel 410 the rolling 2D hash of pixel 408 and the rolling 2D hash of pixel 406, then adding to it the rolling 2D hash of pixel 404 (since that value has been subtracted twice, once when subtracting the rolling 2D hash of pixel 408 and once when subtracting the rolling 2D hash of pixel 406). This may be expressed as an equation as:

$$H(R(A_p, B_p, C_p, D_p)) = H(D) - H(B) - H(C) + H(A)$$

where H(X) is a function that computes the rolling 2D hash of X; R(w,x,y,z) is the rectangle with corners w, x, y, and z; $A_p$ is the location of pixel 404 (for instance, Cartesian coordinates expressed in the form (x,y)); $B_p$ is the location of pixel 406; $C_p$ is the location of pixel 408; $D_p$ is the location of pixel 410; A is the rectangle defined by pixels 402 and 404; B is the rectangle defined by pixels 402 and 406; C is the rectangle defined by pixels 402 and 408; and D is the rectangle defined by pixels 402 and 410.

Thus, for pixels of the image, a rolling 2D hash of a hash window centered upon that pixel may be calculated. For instance, for pixel $X_p$ with coordinates (x,y), the square centered upon that pixel with a side length of s pixels may be expressed using the above formula as $$H(R((x-0.5s, y+0.5s), (x+0.5, y+0.5s), (x-0.5s, y-0.5s), (x+0.5s, y-0.5s)))$$

In an embodiment, a rolling 2D hash of a hash window centered upon pixels near the edge of an image may not be calculated. For instance, using the above square with a side length of s pixels, it may be that a rolling 2D hash of a hash window centered upon pixels within 0.5s from an edge of the image is not calculated, because there does not exist a hash window with a side length of s centered upon that pixel within the image for such an "edge case."

This rolling 2D hash for hash windows centered upon pixels gives a quick way to determine whether two hash windows are likely identical—if their respective rolling 2D hashes do not match, then the hash windows are not identical. If their respective rolling 2D hashes do match, then further processing may be performed to determine whether the two hash windows are identical (as opposed to two different hash windows that cause a hash collision). Many techniques exist for such a comparison. At a basic level, this may be determined by comparing the value of each pixel in one hash window against the value of the pixel in the other image at the same location, and if all of them match, then the two hash windows match.

Figure 5A:
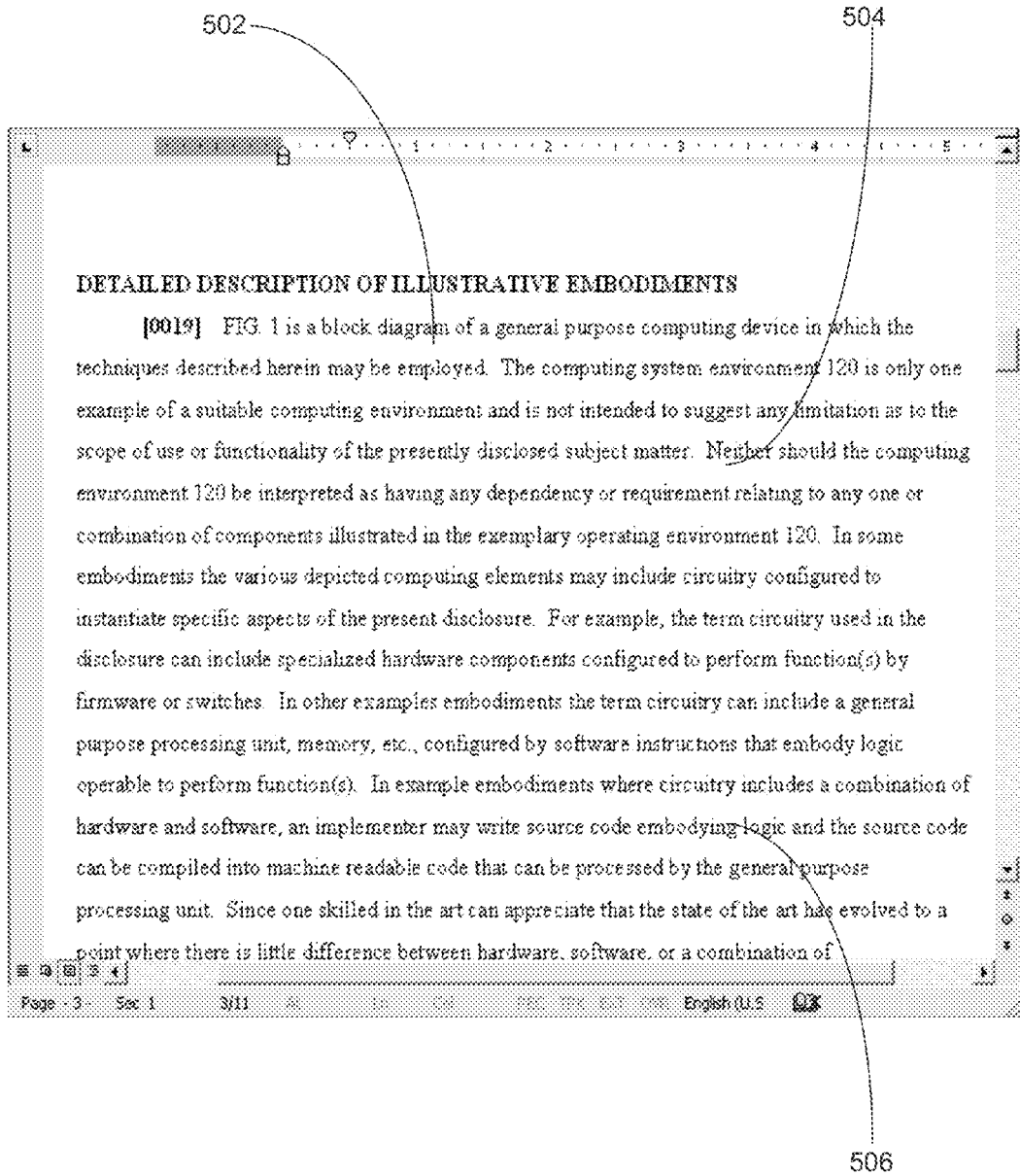
FIG. 5A depicts the example window of FIG. 3A after pivot points for the example window have been determined.

FIG. 5A depicts the example window of FIG. 3A after pivot points for the example window have been determined. There are three pivot points depicted as being found—pivot points 502, 504, and 506.

Figure 5B:
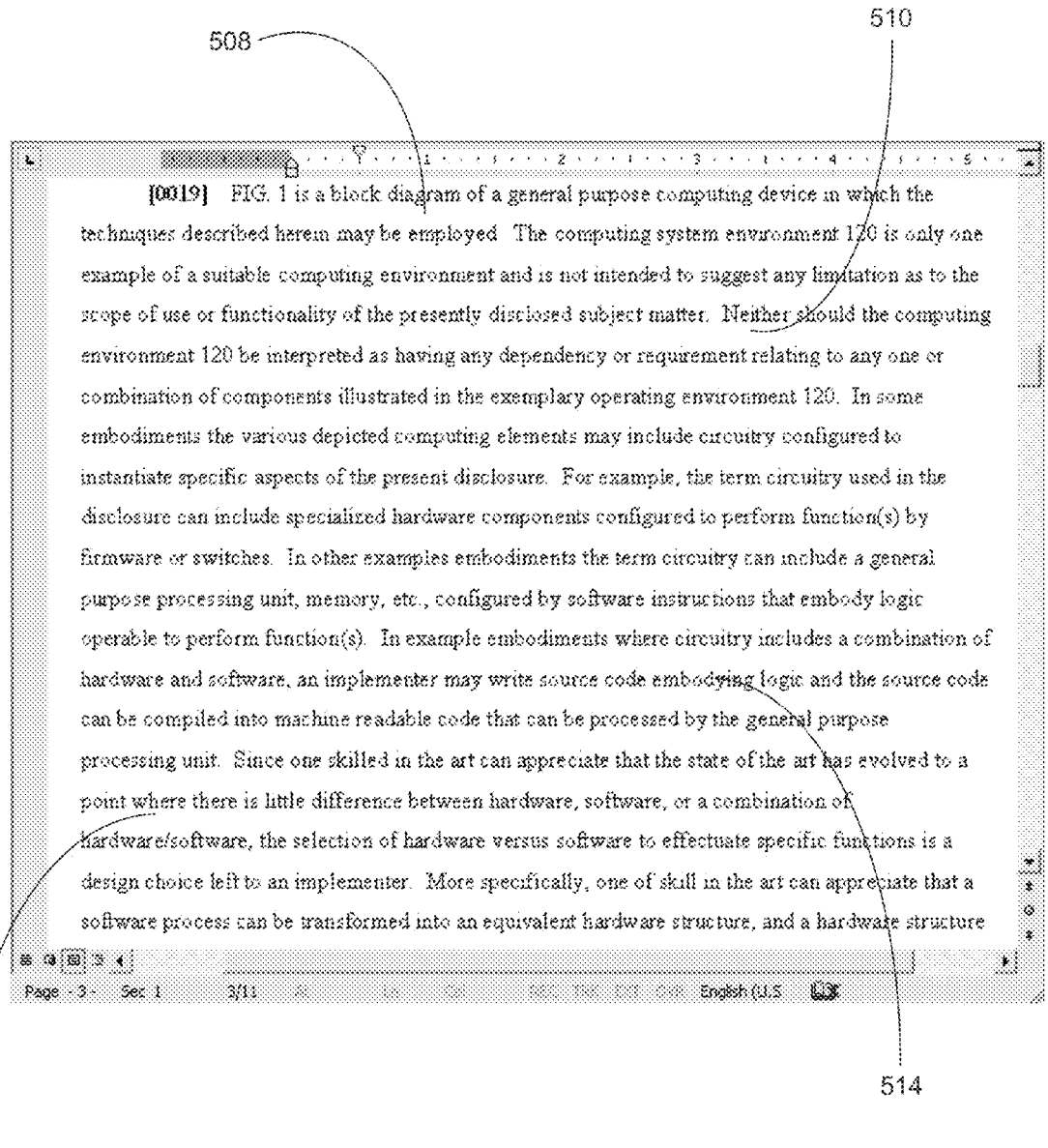
FIG. 5B depicts the example window of FIG. 3B after pivot points for the example window have been determined.

FIG. 5B depicts the example window of FIG. 3B after pivot points for the example window have been determined. There are four pivot points depicted as being found—pivot points 508, 510, 512, and 514.

Once a rolling 2D hash has been computed for a first image and a second image, it may take a significant amount of processing resources to compare each rolling 2D hash of the first image (and possibly other prior images, as well) against each rolling 2D hash of the second image. However, it may save processing resources to instead calculate a smaller number of "pivot points" for each image based on the rolling 2D hashes, and then comparing the pivot points of the first image against those of the second image for matches.

The pivot point(s) of an image may be determined by applying various selection functions to the 2D hashes of the hash windows in the image. The selection function used may be tuned to produce various rates of occurrences of pivot points within an image. For instance, one selection function can do a bit pattern filtering by doing a bit-wise "AND" operation with a predetermined value, and determining that a pivot point occurs where the result of that operation is not zero.

Where a pivot point is found within an image, the operations may "jump ahead" or "jump down" a certain number of pixels (for instance, 100) before checking for more pivot points. This may be done to reduce the amount of processing resources used to find pivot points when those pivot points are likely to be encapsulated within the "larger rectangle" discussed below with regard to FIG. 6.

Thus, a mere match of pivot points may not be proof that the hash windows centered on those pivot points also match, and further processing must be performed to determine whether a match between those hash windows truly occurred. While the use of pivot points alone does not definitely identify matches between hash windows, the use of pivot points may eliminate a great number of hash windows that do not match, and thus reduces the amount of processing resources required to determine matches. For instance, pivot point 502 of FIG. 5A and pivot point 508 of FIG. 5B may be determined to have matching rolling 2D hash values (as well as pivot point 506 of FIG. 5A and pivot point 510 of FIG. 5B; and pivot point 506 of FIG. 5A and pivot point 514 of FIG. 5B). It may be noted that pivot point 512 of FIG. 5B may be determined not to have a matching rolling 2D hash value with a pivot point of FIG. 5A.

Further, it may be that by only comparing hash windows with pivot points of a given value (e.g. 0x2FFFF) means that matching hash windows with other pivot points (e.g. 0x2FFF0) are not identified as matching. However, the present techniques may be implemented without finding every matching hash window. For instance, if a 21-by-21 pixel hash window matches between two images, there are four 20-by-20 pixel hash windows within that 21-by-21 pixel hash window that would also match, and those four 20-by-20 pixel hash windows greatly overlap (sharing all but one pixel with at least one of the other three hash windows).

Figure 6:
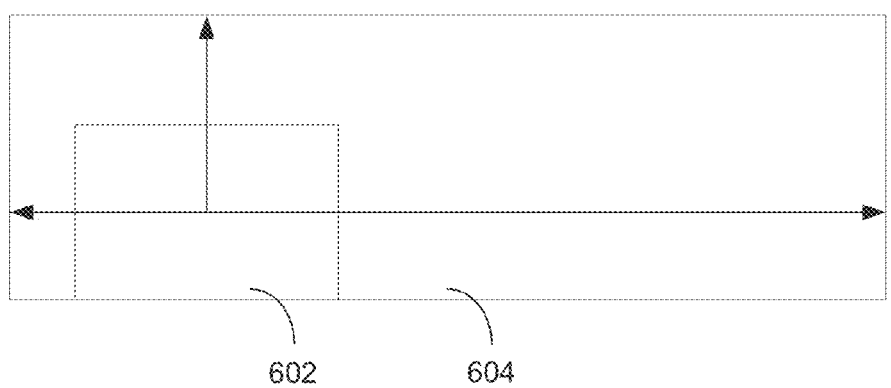
FIG. 6 depicts a technique for determining a larger matching rectangle after a matching hash window between FIGS. 5A and 5B has been determined.

FIG. 6 depicts a technique for determining a larger matching rectangle after a matching hash window between FIGS. 5A and 5B has been determined.

As discussed with respect to FIGS. 5A and 5B, some embodiments using pivot points may not find every matching hash window between two images. The amount of the two images found to be matching may then possibly be increased by taking those hash windows that are found to be matching and seeing if their neighboring pixels match, as well.

In an embodiment, this is done by comparing the rolling 2D hashes of these possibly matching "greater rectangles." Where a match of 20-by-20 pixel hash windows is first found, a check may then be performed on those rectangles after adding the column of pixels immediately to the right of that hash window (creating a 21-by-20 pixel rectangle). This check may be pushed outward to the top, bottom, left, and/or right until an edge of the image is reached, or a match is not found.

There are other ways to perform this expansion to find a larger matching rectangle. For instance, an additional 10 pixels may be added to the hash window, and if that produces a match, an additional 10 on top of that, etc. If no match is found, that 10 pixels may be subdivided, such as by checking whether the hash window including the 5 adjoining pixels match (if not, then subtracting 2 or 3 pixels; if so, then adding 2 or 3 pixels; then checking again). Such a technique may determine the larger matching rectangle in fewer operations than operations that involve adding just one row or column of pixels at a time to the hash window.

As depicted, where hash window 602 is found to match between two images, operations on hash window 602 are performed to find a larger matching rectangle 604 between the two images. Note that larger rectangle 604 does not necessarily have the same aspect ratio as hash window 602. Also, in this embodiment, larger rectangle 604 was produced by expanding hash window (differing amounts) to the top, left and right, but not to the bottom. This may be because there was not a match of the row of pixels below hash window 602 in the two images where it matched.

Figure 7A:
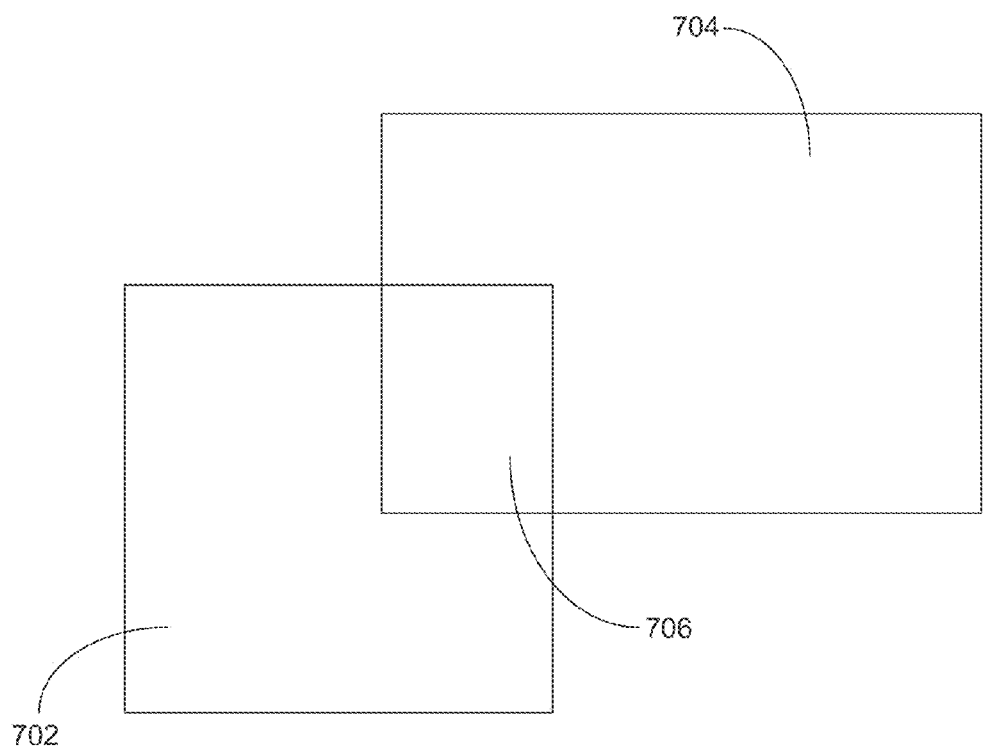
FIG. 7A depicts an example window where two matching rectangles found between two images have been determined, and the rectangles overlap.

FIG. 7A depicts an example window where two matching hash windows found between two images have been determined, and the hash windows overlap. In FIG. 7A, matching hash windows 702 and 704 (in that they match with hash windows in another image, not with each other) overlap in region 706. This may be disfavored, in that dealing with region 706 is repeated—once for hash window 702 and once for hash window 706—when it may be dealt with only a single time by un-overlapping the hash windows, thus saving processing resources.

Figure 7B:
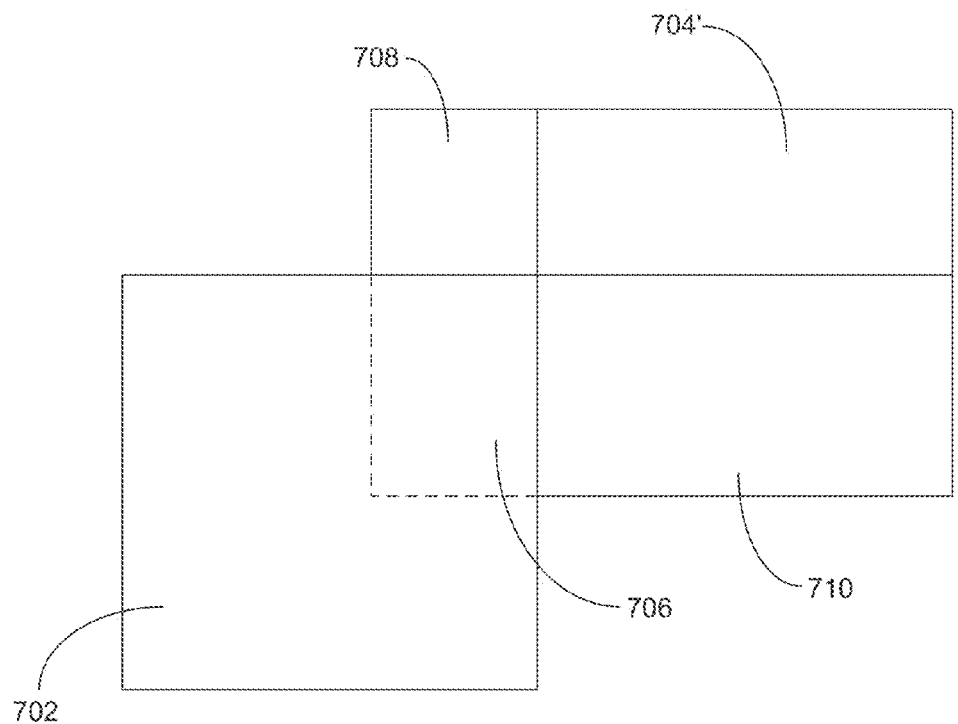
FIG. 7B depicts a second set of matching rectangles based on the image of FIG. 7A, where the second set of matching rectangles do not overlap.

FIG. 7B depicts a second set of matching hash windows based on the image of FIG. 7A, where the second set of matching hash windows do not overlap. It may be advantageous to transform a set of overlapping hash windows to a set of non-overlapping hash windows to reduce the amount of processing resources used by the client in a remote presentation session to display the image frame comprising the hash windows.

Here, hash window 704 of FIG. 7A now comprises hash windows 704', 708, and 710 (and overlapping area 706 is entirely a part of hash window 702). These hash windows that now comprise hash window 704 of FIG. 7A may be determined by the positions of hash windows 702 and 704 (just as the fact that there is an overlap to begin with may be determined by the positions of hash windows 702 and 704). For instance, hash window 710 is defined by the right edge and bottom edge of hash window 704, and the right edge and top edge of hash window 702. Likewise, hash window 708 is defined by the top edge and left edge of hash window 704, and the top edge and right edge of hash window 702, and hash window 704' is defined by the top edge and right edge of hash window 704, and the bottom edge and right edge of hash window 702.

Figure 8:
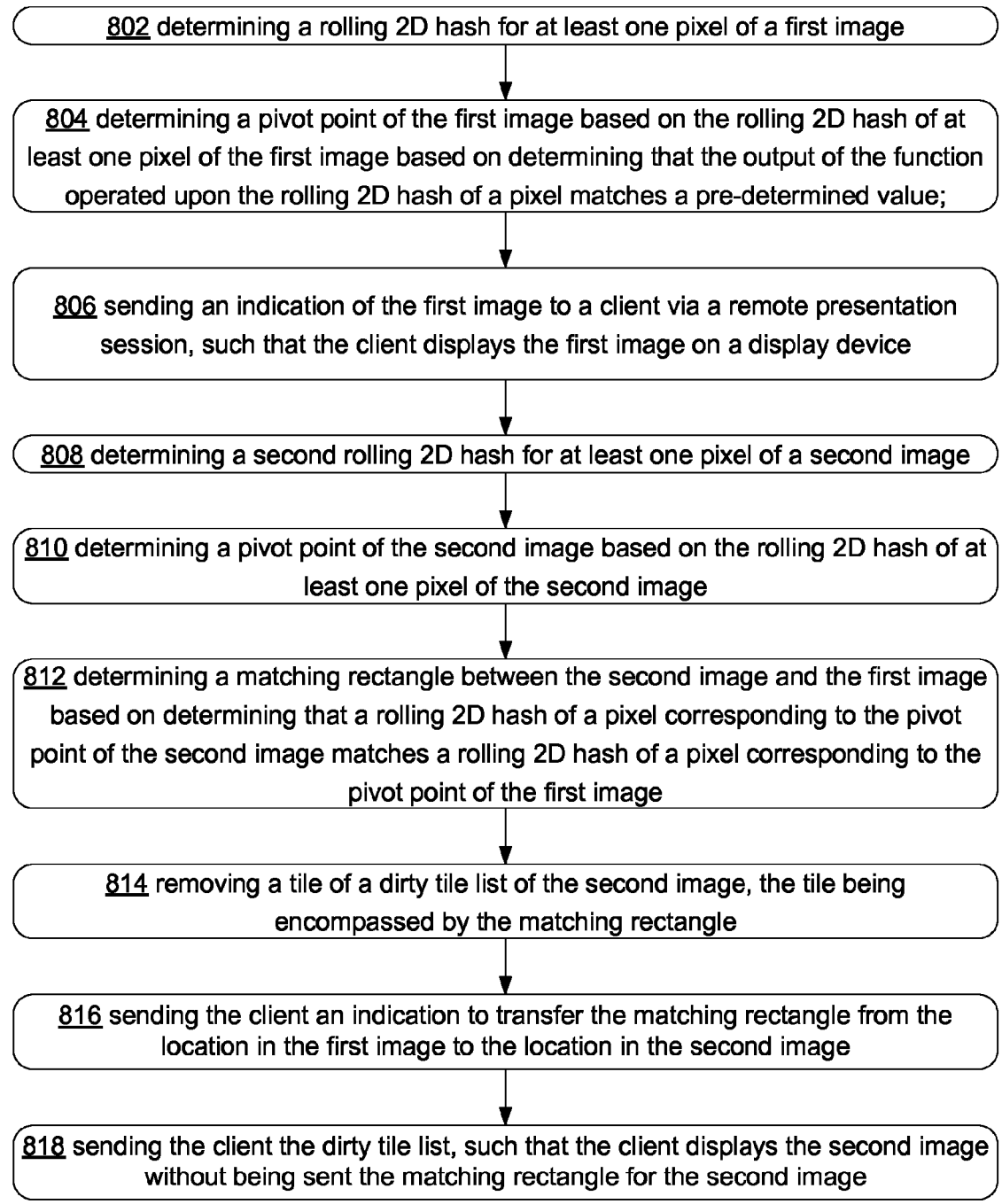
FIG. 8 depicts example operational procedures for acceleration techniques for improved image remoting.

FIG. 8 depicts example operational procedures for acceleration techniques for improved image remoting.

Operation 802 depicts determining a rolling 2D hash for at least one pixel of a first image. A server and a client communicate via a remote presentation session. The server generates a first image that it will send to the client, and upon receipt, the client will then display it on a display device. The server determines a rolling 2D hash for at least one pixel of the first image—for instance, the may calculate a rolling 2D hash for each pixel of the first image, or it may calculate a rolling 2D hash for non-"edge case" pixels of the first image.

Operation 804 depicts determining a pivot point of the first image based on the rolling 2D hash of at least one pixel of the first image based on determining that the output of the function operated upon the rolling 2D hash of a pixel matches a pre-determined value. For instance, the function may comprise a bitwise-sum operation on the value of the rolling 2D hash of a pixel. Then, the output of that function may be compared against a pre-determined value, such as 0x2FFFF. Each pixel that corresponds to that function having an output equal to that pre-determined value may be determined to be a pivot point of the first image.

Operation 806 depicts sending an indication of the first image to a client via a remote presentation session, such that the client displays the first image on a display device. This may include operations such as compressing and encoding the first image. It may also include subdividing the image into a grid of tiles, determining which tiles have been updated in the first image against the image that the client was sent just prior to the first image in a dirty tile list, and sending the client an indication to update only those dirty tiles. Where the client caches tiles and already possesses a dirty tile, the server may send the client an instruction of where to place the cached tile in a memory to help form the first image on the client's side. Where the client does not possess a dirty tile, the server may send the dirty tile to the client.

Operation 808 depicts determining a second rolling 2D hash for at least one pixel of a second image. This may be performed in a manner similar to operation 802.

Operation 810 depicts determining a pivot point of the second image based on the rolling 2D hash of at least one pixel of the second image. This may be performed in a manner similar to operation 804.

Operation 812 depicts determining a matching hash window between the second image and the first image based on determining that a rolling 2D hash of a pixel corresponding to the pivot point of the second image matches a rolling 2D hash of a pixel corresponding to the pivot point of the first image, the matching hash window representing graphical portion of the second image and the first image, the matching hash window having a location in the second image and a location in the first image.

Once pivot points for the first image and the second image have been determined, the pixels at the pivot points of the first and second image may be compared to see if they are part of matching hash windows. This may further be done, for instance, by comparing the rolling 2D hash of the pivot point pixels of the two images, and where the rolling 2D hashes match, a further check to make sure that the rolling 2D hashes do not match as a result of a hash collision, but because those portions (matching hash windows) of the images actually match.

Operation 814 depicts removing a tile of a dirty tile list of the second image, the tile being encompassed by the matching rectangle, the dirty tile list representing a list of tiles that differ between the first image and the second image.

The server may maintain a dirty tile list for the remote presentation session. Where images that are sent to the client in a remote presentation session are subdivided into a grid of tiles, the server may only send the client the "dirty" or updated tiles, since the "clean" tiles are the same as in the image that the client is currently displaying, and thus do not need to be changed. It may be that the client keeps just one frame buffer—and overwrites the dirty portions of the first image with the second image when it receives the second image, based on the dirty tile list.

In an embodiment where matching rectangles between the first image and the second image are determined, these may be handled in a different manner than through the dirty tile list. In this embodiment, if a tile is entirely occupied by part of the matching rectangle it may then be removed from the dirty tile list (or not placed in the dirty tile list in the first place). In an embodiment where a tile is only partly occupied by part of the matching rectangle, it may be kept in (or added to) the dirty tile list, since the other part of the tile may still be dirty (in an embodiment, this other part of the tile may be checked, and only kept in the dirty tile list where it is dirty).

Operation 816 depicts sending the client an indication to transfer the matching rectangle from the location in the first image to the location in the second image, such that the client transfers the matching rectangle from the location in the first image to the location in the second image before the client replaces a dirty tile with a new tile.

This may be done, for instance, in an embodiment where the client uses a single frame buffer to store images from the remote presentation session that will be displayed on the screen (it may also cache images, tiles or other portions of images for re-use). When the client updates the dirty tiles between the first image and the second image it may overwrite part of the matching rectangle. To avoid this, the client may first move the matching rectangle around the frame buffer from its location in the first image to its location in the second image. Then, the client may update dirty tiles (and since tiles associated with the location of the matching rectangle have been removed from the dirty tile list for the second image, the client will not now overwrite part of the matching rectangle) in the frame buffer.

Operation 818 depicts sending the client the dirty tile list, such that the client displays the second image without being sent the matching rectangle for the second image. This may include sending the client one or more tiles to replace the dirty tiles and/or one or more indications of tiles that the client has cached that the client is to use to replace the dirty tiles.

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for conserving resources in a remote presentation session where a client possesses a first image, comprising:
determining a rolling 2D hash for at least one pixel of a second image;
determining a matching rectangle between the second image and the first image based on the rolling 2D hash for at least one pixel of the second image and a rolling 2D hash for at least one pixel of the first image, the matching rectangle having a location in the second image and a location in the first image; and
sending the client an instruction to transfer the matching rectangle from the location in the first image to the location in the second image, such that the client displays the second image without being re-sent the pixel values within the matching rectangle for the second image.

2. The method of claim 1, wherein determining the matching hash window between the second image and the first image comprises:
determining a pivot point for at least one pixel of the first image, and at least one pixel of the second image; and
determining that a rolling 2D hash of a pivot point of the first image matches a rolling 2D hash of a pivot point of the second image.

3. The method of claim 2, wherein a pivot point comprises an output of a function operated upon the rolling 2D hash of a pixel, and determining a pivot point comprises determining that the output of the function operated upon the rolling 2D hash of the pixel matches a pre-determined value or a pre-determined bit pattern.

4. The method of claim 2, wherein, upon determining a pivot point for a pixel of the first image, no pixel within a pre-determined number of pixels are checked to determine whether that pixel is a pivot point.

5. The method of claim 1, further comprising:
determining a larger matching rectangle based on the matching hash window, the first image, and the second image, the larger matching rectangle encompassing the matching hash window, the larger matching rectangle having a second location in the second image and a second location in the first image; and
wherein sending the client an instruction to transfer the matching rectangle from the location in the first image to the location in the second image includes: sending the client an instruction to transfer the larger matching rectangle from the second location in the first image to the second location in the second image.

6. The method of claim 1, wherein an image comprises a plurality of tiles, and sending the client an instruction to transfer the matching rectangle from the location in the first image to the location in the second image includes:
sending the client a list of dirty tiles between the first image and the second image; and further comprising:
removing a tile entirely covered by the matching rectangle from the list of dirty tiles before sending the list of dirty tiles to the client.

7. The method of claim 1, wherein sending the client an instruction to transfer the matching rectangle from the location in the first image to the location in the second image includes:
sending the client an instruction to transfer the matching rectangle from the location in the first image to the location in the second image before the client copies a tile to the location of a tile in the list of dirty tiles.

8. The method of claim 1, wherein determining a rolling 2D hash for at least one pixel of a second image multiplying a value of the pixel by a prime number.

9. The method of claim 1, further comprising:
determining a second matching rectangle between the second image and the first image, the second matching rectangle overlapping with the first rectangle;
dividing the second matching rectangle into at least one modified second matching rectangle, no modified second matching rectangle overlapping with the first rectangle; and
sending the client an instruction to transfer each second modified matching rectangle from the location in the first image to the location in the second image, such that the client displays the second image without being sent a modified second matching rectangle for the second image.

10. The method of claim 1, wherein determining a rolling 2D hash for at least one pixel of a second image comprises:

converting the second image from an RGB representation to a luminance representation.

11. The method of claim 1, wherein a rolling 2D hash of a pixel comprises a hash of a hash window encompassing the pixel.

12. The method of claim 1, wherein the matching hash window corresponds to a window move or scroll between the first image and the second image.

13. A system for conserving resources in a remote presentation session, where a client possesses a first image, comprising:
   a processor;
   a memory communicatively coupled to the processor, the memory bearing computer-executable instructions, that when executed on the processor cause the processor to perform operations comprising:
      determining a rolling 2D hash for at least one pixel of a second image;
      determining a matching hash window between the second image and the first image based on the rolling 2D hash for at least one pixel of the second image and a rolling 2D hash for at least one pixel of the first image, the matching hash window having a location in the second image and a location in the first image; and
      sending the client an instruction to transfer the matching rectangle from the location in the first image to the location in the second image, such that the client displays the second image without being sent the matching rectangle for the second image.

14. The system of claim 13, wherein determining the matching hash window between the second image and the first image comprises:
   determining a pivot point for at least one pixel of the first image, and at least one pixel of the second image; and
   determining that a rolling 2D hash of a pivot point of the first image matches a rolling 2D hash of a pivot point of the second image.

15. The system of claim 14, wherein a pivot point comprises an output of a function operated upon the rolling 2D hash of a pixel, and determining a pivot point comprises determining that the output of the function operated upon the rolling 2D hash of the pixel matches a pre-determined value.

16. The system of claim 14, wherein, upon determining a pivot point for a pixel of the first image, no pixel within a pre-determined number of pixels are checked to determine whether that pixel is a pivot point.

17. The system of claim 13, wherein the memory further bears computer-executable instructions, that when executed on the processor cause the processor to perform operations comprising:
   determining a larger matching rectangle based on the matching hash window, the first image, and the second image, the larger matching rectangle encompassing the matching hash window, the larger matching rectangle having a second location in the second image and a second location in the first image; and
   wherein sending the client an instruction to transfer the matching rectangle from the location in the first image to the location in the second image includes: sending the client an instruction to transfer the larger matching rectangle from the second location in the first image to the second location in the second image.

18. The system of claim 13, wherein an image comprises a plurality of tiles, and sending the client an instruction to transfer the matching rectangle from the location in the first image to the location in the second image includes:
   sending the client a list of dirty tiles between the first image and the second image; and further comprising:
   removing a tile entirely covered by the matching rectangle from the list of dirty tiles before sending the list of dirty tiles to the client.

19. The system of claim 13, wherein sending the client an instruction to transfer the matching rectangle from the location in the first image to the location in the second image includes:
   sending the client an instruction to transfer the matching rectangle from the location in the first image to the location in the second image before the client copies a tile to the location of a tile in the list of dirty tiles.

20. A computer-readable storage medium bearing computer-readable instructions, that when executed on a computer, cause the computer to perform operations comprising:
   determining a rolling 2D hash for at least one pixel of a first image;
   determining a pivot point of the first image based on the rolling 2D hash of at least one pixel of the first image based on determining that the output of the function operated upon the rolling 2D hash of a pixel matches a pre-determined value;
   sending an indication of the first image to a client via a remote presentation session, such that the client displays the first image on a display device;
   determining a second rolling 2D hash for at least one pixel of a second image;
   determining a pivot point of the second image based on the rolling 2D hash of at least one pixel of the second image;
   determining a matching hash window between the second image and the first image based on determining that a rolling 2D hash of a pixel corresponding to the pivot point of the second image matches a rolling 2D hash of a pixel corresponding to the pivot point of the first image, the matching hash window representing graphical portion of the second image and the first image, the matching hash window having a location in the second image and a location in the first image;
   removing a tile of a dirty tile list of the second image, the tile being encompassed by the matching rectangle, the dirty tile list representing a list of tiles that differ between the first image and the second image;
   sending the client an indication to transfer the matching rectangle from the location in the first image to the location in the second image, such that the client transfers the matching rectangle from the location in the first image to the location in the second image before the client replaces a dirty tile with a new tile; and
   sending the client the dirty tile list, such that the client displays the second image without being sent the matching rectangle for the second image.

* * * * *